United States Patent [19]

Tsuru et al.

[11] Patent Number: 4,619,289
[45] Date of Patent: Oct. 28, 1986

[54] SOLENOID-CONTROLLED VALVE

[75] Inventors: Naohiko Tsuru, Okazaki; Yoshihisa Nomura, Toyota, both of Japan

[73] Assignees: Nippondenso Co., LTD., Kariya; Toyota Jidosha Kabushiki Kaisha, Toyota, both of Japan

[21] Appl. No.: 687,740

[22] Filed: Dec. 28, 1984

[30] Foreign Application Priority Data

Dec. 28, 1983 [JP] Japan ................................ 58-249785

[51] Int. Cl.$^4$ ............................................. F16K 31/02
[52] U.S. Cl. ............................ 137/627.5; 137/596.17
[58] Field of Search ............ 251/139, 141, 129.16, 251/129.21; 137/627.5, 596.17, 864, 870

[56] References Cited

U.S. PATENT DOCUMENTS

| | | | |
|---|---|---|---|
| 1,193,036 | 8/1916 | McElroy | 137/596.17 |
| 3,040,775 | 6/1962 | Ray | 137/596.17 |
| 3,853,269 | 12/1974 | Graber | 137/627.5 |
| 3,970,111 | 7/1976 | Brune et al. | 137/596.17 |
| 3,989,063 | 11/1976 | Brouwers et al. | 251/139 |
| 4,086,889 | 5/1978 | Yagi et al. | 137/596.17 |

FOREIGN PATENT DOCUMENTS 0051965 5/1982 European Pat. Off. .
58-17169 4/1983 Japan .

*Primary Examiner*—Margaret A. Focarino
*Assistant Examiner*—Noah Kamen
*Attorney, Agent, or Firm*—Cushman, Darby & Cushman

[57] ABSTRACT

A solenoid-controlled valve of the present invention is provided with a valve housing having first, second and third ports, first and second movable members housed in the valve housing to freely move along its longitudinal axis and is made of magnetic material, and a magnetic circuit for magnetically attracting the first and second movable members independently in order to move them in the direction of the axis. The magnetic circuit includes a solenoid, a magnetic flux by-pass for by passing the second movable member, and a magnetic resistance attached to that portion of the magnetic circuit which is by-passed by the magnetic flux by-pass. The solenoid-controlled valve further has first and second valve members, which are actuated by the movement of the first and second movable members in the direction of the axis to independently open and close the first and second ports.

6 Claims, 4 Drawing Figures

SOLENOID-CONTROLLED VALVE

BACKGROUND OF THE INVENTION

The present invention relates to a solenoid-controlled valve and, more particularly, to a solenoid-controlled valve capable of achieving changeover and control at three positions by exciting only one particular solenoid.

Two types of solenoid-controlled valves are conventionally well known as those which can achieve changeover and control at three positions. The first has two solenoids, and it is intended to achieve changeover and control at three positions by exciting the solenoids independently. The second has only one solenoid, and it is intended to achieve changeover and control at three positions by changing the value of current by which the solenoid is excited, as disclosed in Japanese Utility Model Publication No. 58-17169.

The above-mentioned two types of solenoid-controlled valves have the following drawbacks. Since the first type uses two solenoids, it naturally needs two magnetic circuits in which heavy yokes must be included. Therefore, as a whole it becomes large and heavy.

On the contrary, the second type needs only one magnetic circuit because it has only one solenoid. Therefore, it can be smaller and lighter when compared with the first type. However, the second type includes a slider, which is successively moved to first, second and third positions by a magnetic attraction force generated by the solenoid, and two valve members, arranged at both ends of the slider, which independently open and close at each position of the slider. In the case of this solenoid-controlled valve, the valve members become complicated in construction, and high accuracy is needed to assemble these valve members on the slider. Therefore, it cannot be prepared easily and its cost becomes high.

SUMMARY OF THE INVENTION

The object of the present invention is, therefore, to eliminate the drawbacks of the above-mentioned two types of solenoid-controlled valves and provide a solenoid-controlled valve which can be prepared easily and which can be smaller and lighter.

The object of the present invention can be achieved by a solenoid-controlled valve comprising:

a valve housing made of magnetic material and having a longitudinal axis, the valve housing including a control chamber defined therein, first and second connecting ports formed in the outer wall of the valve housing, a first passage formed at one end of the valve housing, when viewed in the direction of the longitudinal axis, and having a first opening opened at the control chamber, the first passage serving to connect the first connecting port to the control chamber, a second passage formed at the other end of the valve housing, when viewed in the direction of the longitudinal axis, and having a second opening opened at the control chamber, the second passage serving to connect the second connecting port to the control chamber, and a third connecting port formed in the outer wall of the valve housing and communicated with the control chamber;

first and second valve members for opening and closing the first and second passages;

a fixed member positioned between the first and the second openings in the control chamber of the valve housing, fixed concentric with the longitudinal axis, and made of magnetic material;

a first movable member positioned on the first opening side in the valve housing, facing the fixed member, made of magnetic material, and movable in the direction of the longitudinal axis;

first engaging means for engaging the first movable member with the first valve member to integrally move them in the direction of the longitudinal axis;

first spring means for urging the first movable member in the direction in which the first valve member opens or closes the first passage;

a second movable member positioned on the second opening side in the valve housing, facing the fixed member, made of magnetic material, and movable in the direction of the longitudinal axis;

second engaging means for engaging the second movable member with the second valve member to integrally move them in the direction of the longitudinal axis;

second spring means for urging the second movable member in the direction in which the second valve member opens or closes the second passage;

a solenoid arranged enclosing the valve housing to apply a magnetic field to the inside of the valve housing;

a yoke member arranged enclosing the solenoid to define a magnetic circuit which includes the yoke member, first movable member, fixed member and second movable member;

a magnetic flux by-pass defined between the fixed member and the yoke member to by-pass the second movable member in the magnetic circuit to pass magnetic flux therethrough, the magnetic flux by-pass being saturated with a magnetic flux smaller than that in the magnetic circuit; and magnetic resistance means arranged in a by-passed passage including the second movable member in the magnetic circuit which is by-passed by the magnetic flux by-pass.

According to the present invention, the magnetic flux by-pass is defined between the fixed member and the yoke member, as described above, to by-pass the second movable member in the magnetic circuit and to pass magnetic flux therethrough. In addition, the density of magnetic flux with which the magnetic flux by-pass is saturated is set smaller than that in the magnetic circuit. Further, the magnetic resistant means is provided in the by-passed passage in the magnetic circuit, which is defined between the fixed member and the yoke member including the second movable member. Therefore, the first and second movable members can be moved independently by changing the current value applied to the solenoid, thereby enabling the first and second valve members to move so as to open or close the first and second openings, independently. More specifically, in a case where the value of current applied to the solenoid is small and the magnetic flux generated by the solenoid is not so large as to saturate the magnetic by-pass, the magnetic flux flows to by-pass mainly the by-passed passage in the magnetic circuit since the magnetic flux resistance is provided in the by-passed passage. Since the magnetic flux flows mainly through a part of the magnetic circuit defined by the yoke member, fixed member and first movable member and includes the magnetic by-pass, the first movable member can be moved in the direction of the longitudinal axis by a magnetic attraction force generated by the partial magnetic circuit. The first opening can be thus opened and closed by this movement of the first movable member. Moreover, no magnetic flux flows through the by-passed passage in this case because of the above-mentioned magnetic resistance, and the second movable member is not moved by the magnetic attraction force.

On the other hand, when the value of current applied to the solenoid is made large and the magnetic flux generated by the solenoid becomes so large as to saturate the magnetic by-pass, the magnetic flux flows through the by-passed passage against the magnetic flux resistance. In this case, therefore, the magnetic flux flows through the whole of the magnetic circuit including the by-passed passage, and the second movable member is also moved similarly to the first movable member by magnetic attraction force which is generated by the magnetic flux flowing through the whole of the magnetic circuit. Namely, the first and second valve members can be moved so as to open or close the first and second openings, respectively.

As described above, the first and second movable members, that is, first and second valve members, can be operationally controlled independently by changing at two steps the value of current applied to the solenoid, thereby enabling changeover control to be achieved at three positions. In other words, a solenoid-controlled valve can be obtained wherein the changeover control can be attained at three positions using a solenoid.

Since the solenoid-controlled valve of the present invention uses only one solenoid, it can be lighter and smaller.

According to the solenoid-controlled valve of the present invention, the first and second movable members for actuating the first and second valve members are made independent of the other. Therefore, the solenoid-controlled valve can be made simpler in construction and easier to manufacture and assemble, thereby enabling its cost to be made lower.

DETAILED DESCRIPTION OF THE PREFERRED EMBODIMENTS

Figure 1:
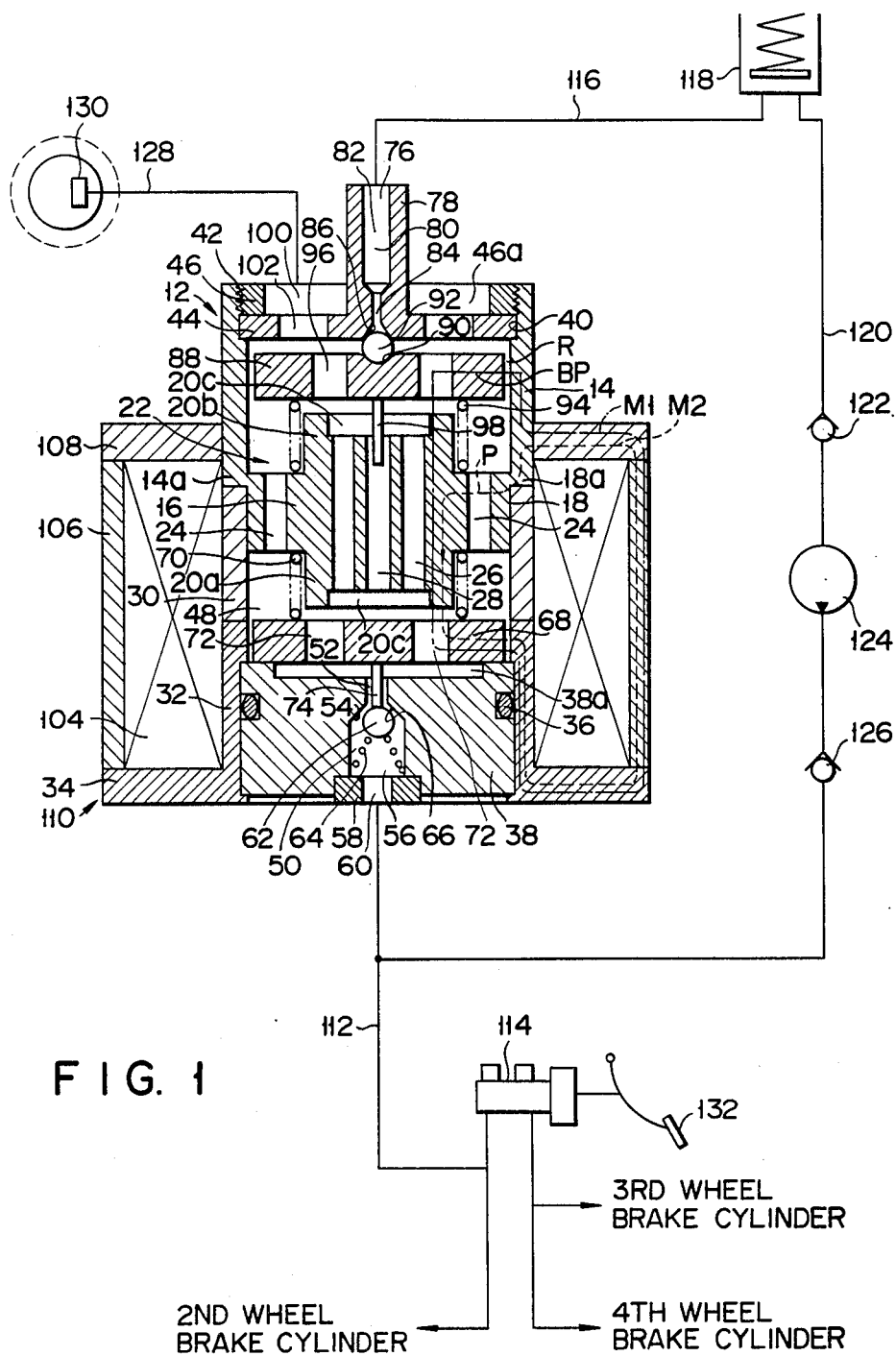
FIG. 1 is a sectional view showing an example of the solenoid-controlled valve according to the present invention which is applied to an antiskid brake system of a car.

FIG. 1 shows a case where an example of the solenoid-controlled valve according to the present invention is applied to an antiskid brake system of a car.

The solenoid-controlled valve has a valve housing 12. The valve housing 12 has a first bottomed cylindrical housing portion 14 made of magnetic material. Formed in an outer circumferential wall 14a of a bottom wall 16 of the housing portion 14 is a stepped portion 18, which serves to reduce the sectional area of the connection between the outer circumferential wall 14a and the bottom wall 16. Namely, the portion between the outer circumferential wall 14a and the bottom wall 16 is defined by a throttled portion 18a. The outer diameter of the stepped portion 18 is the same as the inner diameter of the first housing portion 14. As shown in FIG. 1, cylindrical projections 20a and 20b, projected on both sides of the bottom wall 16 when viewed in the direction of the longitudinal axis of the first housing portion 14, are formed at the center of the bottom wall 16 in the first housing portion 14. Recesses 20c are formed on the projected end face of each of the projections 20a and 20b. Plural through-holes 24 are formed in the bottom wall 16 of the first housing portion 14. Plural through-holes 26 are also formed in the projections 20a and 20b of the bottom wall 16. The through-holes 24 and 26 are arranged on circles which is concentric with the axis. Both ends of each of these through-holes 26 are communicated with the recesses 20c. A guide hole 28 passes, concentric with the axis, through the projections 20a and 20c of the bottom wall 16. Both ends of this guide hole 28 are also communicated with the recesses 20c.

The projections 20a and 20b are made of magnetic material and serve as a fixed member. Therefore, these projections 20a and 20b will be hereafter referred to as a fixed member 22.

A second cylindrical housing portion 30 made of non-magnetic material is integrally connected to the stepped portion 18 of the first housing portion 14. The outer and inner diameters of the second housing portion 30 are same as those of the first housing portion 14. Therefore, the second housing portion 30 is reliably connected to the first housing portion 14 in such a way that one end of the former is fitted onto the stepped portion 18 of the latter. Also connected to the other end of the second housing portion 30 is a third cylindrical housing portion 32 made of magnetic material. A flange 34 is integrally formed to that end of the third housing portion 32 which is remote from the second housing portion 30. Connections between the first and the second housing portion 14 and 30 and between the second and the third housing portion 30 and 32 can be attained by soldering, for example.

A plug 38 made of non-magnetic material is fitted into the third housing portion 32 through an O-ring 36. The plug 38 is fixed to the third housing portion 32 by calking the third housing portion 32. On the other hand, a stepped portion 40 is formed on the inner circumferential face of an opened end of the first housing portion 14. A threaded portion 42 is formed on the inner circumferential face of the stepped portion 40 on the open-end side of the first housing portion 14. An end plate 44 made of non-magnetic material is fitted into the stepped portion 40. This end plate 44 is held by a ring screw 46 screwed into the threaded portion 42 of the stepped portion 40.

Therefore, the inside of the above-described valve housing 12 serves as a control chamber 48 defined by the first, second and third housing portions 14, 30 and 32, plug 38 and end plate 44.

Formed in the outer wall of the above-described valve housing 12, that is, in the plug 38, is a first passage 50 extending concentrically with the axis of the valve housing 12. The first passage 50 is opened at one end thereof at the outer end face of the plug 38, while it is communicated with the above-mentioned control chamber 48 at the other end thereof. The first passage 50 includes a small-diameter portion 52, tapered portion 54 and large-diameter portion 56 in this order when viewed from the side of the control chamber 48. A recess, communicating with the first passage 50, is formed on the outer end face of the plug 38, and a ring 58 with an inner diameter smaller than that of the large-diameter portion 56 is fitted into the recess. An inner bore of this ring 58 is communicated with the first passage 50 and thus defines a first port 60, which is communicated with the control chamber 48 via the first passage 50.

A first spherical valve member 62, which serves to open and close the first passage 50, is housed in the large-diameter portion 56 of the first passage 50. A conical valve spring 64 is interposed between the first valve member 62 and the ring 58 to urge the first valve member 62 toward the small-diameter portion 52 of the first passage 50. It should be noted that the inner or tapered face of the tapered portion 54 in the first passage 50 is defined as a first valve seat 66.

A first movable member 68 having the shape of a circular plate and made of magnetic material is arranged, concentric with and movable along the axis of the valve housing 12, in the control chamber 48 between the fixed member 22 and the plug 38. A first urging spring 70 is interposed between the first movable member 68 and the fixed member 22, enclosing the projection 20a. The first urging spring 70 urges the first movable member 68 toward the plug 38, thereby causing the first movable member 68 to be pressed against the plug 38. It should be noted here that the opening of the first passage 50 positioned on the side of the control chamber 48 is not closed by the first movable member 68 even when the first movable member 68 is contacted with the plug 38. Namely, a recess 38a, communicating with the first passage 50, is formed on that inner end face of the plug 38 which faces the first movable member 68, while plural through-holes 72, which communicate the recess 38a with the control chamber 48 when the first movable member 68 is contacted with the plug 38, are formed in the first movable member 68. These through-holes 72 are arranged on a circle which is concentric with the axis of the first movable member 68. A coupling rod 74, made of non-magnetic material and extending along the axis, is fixed to that end face of the first movable member 68 which faces the plug 38. This coupling rod 74 extends into the large-diameter portion 56 through the small-diameter portion 52 of the first passage 50 and is contacted with the first valve member 62. In the case of this example of the solenoid-controlled valve, the coupling rod 74 lifts the first valve member 68 from the valve seat 66 against the valve spring 64, as shown in FIG. 1, when the first movable member 68 is contacted with the plug 38. Therefore, the first port 60 is communicated with the control chamber 48 through the first passage 50, recess 38a and through-holes 72 in this manner.

On the other hand, the end plate 44 in the valve housing 12 is provided with a second port 76. More specifically, a cylindrical portion 78 extending outside along the axis is formed in the center of that end face of the end plate 44 positioned on the side of the ring screw 46. A second passage 80 is concentrically formed in the cylindrical portion 78. The second passage 80 includes large- and small-diameter portions 82 and 84 in this order when viewed from the projected end side of the cylindrical portion 78. Therefore, the above-mentioned second port 76 is defined by the opening of the large-diameter portion 82, which is opened at the projected end of the cylindrical portion 78. The opening of the small-diameter portion 84 in the second passage 80, which is opened at the inner end face of the end plate 44, is formed at its tapered portion, which is gradually enlarged toward the control chamber 48, and the inner circumferential face of this tapered portion is defined as a second valve seat 86.

A second movable member 88 having the shape of a circular plate and made of magnetic material is housed in the control chamber 48 between the end plate 44 and the fixed member 22. The second movable member 88 is arranged concentric with and freely movable along the axis. A semi-spherical recess 90 is formed in the center of that end face of the second movable member 88 which faces the inner end face of the end plate 44, and a second spherical valve member 92 is held in the recess 90. A second urging spring 94 is interposed between the second movable member 88 and the fixed member 22, enclosing the projection 20b. The second urging spring 94 urges the second movable member 88 toward the end plate 44. In the case of this example of the solenoid-controlled valve, therefore, the second valve member 92 is urged to sit on the second valve seat 86 of the end plate 44, and the second passage 80 is thus usually closed, as shown in FIG. 1. In other words, the second port 76 is not usually left communicating with the control chamber 48. Plural through-holes 96 are formed in the second movable member 88, extending along the axis. These plural through-holes 96 are arranged on a circle which is concentric with the axis of the second movable member 88. Fixed to the center of that end face of the second movable member 88 positioned on the side of the fixed member 22 is a guide rod 98 concentrically extending along the axis and made of non-magnetic material. The guide rod 98 is inserted into the guide hole 28 defined in the fixed member 22, thereby enabling the second movable member 88 to be guided along the axis by means of these guide rod 98 and hole 28.

It should be noted here that the gap between the inner circumferential wall of the first housing portion 14 and the outer circumferential wall of the second movable member 88 is set larger than that between the inner circumferential wall of the third housing portion 32 and the outer circumferential wall of the first movable member 68. Namely, an air gap between the inner circumferential wall of the first housing portion 14 and the outer circumferential wall of the second movable member 88 serves as a magnetic resistance R arranged in a main magnetic circuit, which will be described later.

The valve housing 12 is provided with a third port 100, which is defined by an inner bore 46a of the ring screw 46. The third port 100 usually communicates with the control chamber 48 via plural through-holes 102 in the end plate 44. These through-holes 102 are arranged on a circle which is concentric with the axis of the end plate 44.

A solenoid 104 is arranged outside the valve housing 12 so as to enclose the valve housing 12. The solenoid 104 extends from the flange 34 of the third housing portion 32 over the second housing portion 30. The solenoid 104 is covered by a cylindrical cover 106 made of magnetic material. One end of the cover 106 is fixed to the flange 34 of the third housing portion 32, while the other end thereof is fixed to the outer circumferential edge of a ring plate 108 made of magnetic material. The ring plate 108 is remotely positioned from the flange 34 of the third housing portion 32, and the inner circumferential end of the ring plate 108 is fixed onto the outer circumference of the first housing portion 14. Namely, the flange 34, cover 106 and ring plate 108 serve as a yoke member 110 for housing the solenoid 104.

The above-mentioned solenoid 104 is connected to a power source circuit (not shown). When current is applied from the power source circuit to the solenoid 104 to excite the solenoid 104, magnetic flux generated by the solenoid 104 can flow through a first magnetic circuit M1 defined by the yoke member 110, first housing portion 14, second movable member 88, fixed member 22, first movable member 68 and third housing portion 32 and shown by a dot and dash line in FIG. 1. It can also flow through a second magnetic circuit M2 which is a part of the first magnetic circuit M1 and is defined by the yoke member 110, first housing portion 14, fixed member 22, first movable member 68 and third housing portion 32. The second magnetic circuit M2 is shown by a broken line in FIG. 1. It should be noted here that the magnetic flux passage defined by the yoke member 110 or ring plate 108, first housing portion 14 and fixed member 22 becomes a magnetic flux by-pass P for the magnetic circuit M1.

The operation of the above-described solenoid-controlled valve will be described below. No current is applied to the solenoid 104 under such a state as shown in FIG. 1, and the solenoid-controlled valve is thus held at a neutral position N. When it is at the neutral position N, the first and third ports 60 and 100 communicate with the control chamber 48, while the second port 76 is shut off from the control chamber 48, as described above.

When current is applied to the solenoid 104, magnetic flux, which tends to flow through the above-mentioned magnetic circuits M1 and M2, is generated by the excited solenoid 104. When the value of current applied to the solenoid 104 is small and the magnetic flux caused by the solenoid 104 is not so large as to cause saturation in the magnetic flux flowing through the above-mentioned magnetic flux by-pass P, this magnetic flux flows mainly through the second magnetic circuit M2. This is because a magnetic resistance R, which comprises the above-mentioned air gap, is present at that portion BP of the first magnetic circuit M1 by-passed by the magnetic flux by-pass P of the second magnetic circuit M2.

When magnetic flux flows like this, i.e., mainly through the second magnetic circuit M2, the first movable member 68 is attracted toward the fixed member 22 against the first urging spring 70 by magnetic attraction force caused by the flow of this magnetic flux. Since the first valve member 62 is also moved toward the fixed member 22, following the movement of the first movable member 68, the first valve member 68 sits on the first valve seat 66 to thereby close the first passage 50. Communication between the first port 60 and the control chamber 48 is thus closed. In other words, the solenoid-controlled valve is changed over from the above-mentioned neutral position N to a first changeover position A. When the valve is at this first changeover position A, both of the first and second ports 60 and 76 are closed but only the third port 100 is opened.

When large current is applied to the solenoid 104, keeping the solenoid-controlled valve at the neutral position N, and magnetic flux caused by the excited solenoid 104 is so large as to cause saturation in the magnetic flux flowing through the magnetic flux by-pass P of the second magnetic circuit M2, the magnetic flux flows, against the magnetic resistance R, through a by-passed magnetic flux passage BP of the first magnetic circuit M1 by-passed by the magnetic flux by-pass P of the second magnetic circuit M2 as well as through the second magnetic circuit M2. In this case, therefore, the first movable member 62 is moved to the fixed member 22 by the magnetic attraction force caused by the second magnetic circuit M2 to thereby close the first port 60, as described above, while the second movable member 88 is attracted toward the fixed member 22 against the second urging spring 94 by the magnetic attraction force caused by the magnetic flux flowing through the by-passed magnetic flux passage BP of the first magnetic circuit M1. The movement of this second movable member 88 causes the second valve member 92, which is held by the second movable member 88, to be separated from the second valve seat 86, thereby communicating the second port 76 with the control chamber 48. Namely, the second port 76 becomes opened. As a result, the solenoid-controlled valve is switched from the neutral position N to a second changeover position B.

According to the solenoid-controlled valve of the present invention, changeover control from the neutral position N to the first or second changeover position can be achieved by changing at two steps the value of current applied to the solenoid 104. Namely, the solenoid-controlled valve of the present invention can be changed over at three positions, that is, neutral, first and second positions N, A and B, using only one solenoid 104.

Since the solenoid-controlled valve of the present invention uses only one solenoid, as described above, the magnetic circuit resulting in increasing the weight of the device may be substantially only one in number, thereby enabling the whole of the solenoid-controlled valve to be made lighter in weight and smaller-sized.

According to the solenoid-controlled valve of the present invention, the first and second movable members 68 and 88 for actuating the first and second valve members 62 and 84 are moved by magnetic attraction force, independently. Therefore, the actuating mechanism of these first and second movable members 68 and 88 becomes extremely simpler. Preparation of the first and second valve members 62 and 84 and of the first and second movable members 68 and 88 thus becomes easier, and assembly of these members also becomes easier, thereby enabling the manufacturing cost of the solenoid-controlled valve to be reduced.

Although the magnetic resistance R provided in the by-passed magnetic flux passage BP of the first magnetic circuit M1 has been defined by the air gap in the case of the above-described example, a bush made of non-magnetic material may be arranged between the inner circumferential wall of the first housing portion 14 and the outer circumferential wall of the second movable member 88.

The above-described solenoid-controlled valve of the present invention is applied to a antiskid brake system of a car, as already described above. The first port 60 of the solenoid-controlled valve is connected to a first pressure chamber of a tandem master cylinder 114, which is connected to a brake pedal 132, through a hydraulic pipe 112. The second port 76 of the solenoid-controlled valve is connected to a reservoir tank 118 through a hydraulic pipe 116. The reservoir tank 118 is connected to the hydraulic pipe 112 through a hydraulic pipe 120 to which a check valve 122, hydraulic pump 124 and check valve 126 are attached in this order when viewed from the side of the reservoir tank 118. The third port 100 of the solenoid-controlled valve is connected to a wheel brake cylinder 130 of the car through a hydraulic pipe 128.

The first pressure chamber of the master cylinder 114 is connected to another wheel brake cylinder via a hydraulic pipe branched from the hydraulic pipe 112, and a second pressure chamber of the master cylinder 114 is connected to the other two remaining wheel brake cylinders of the car. Connections between these wheel brake cylinders and the master cylinder 114 are the same as that between the master cylinder 114 and the wheel brake cylinder 130, and therefore, description on the former will be omitted.

The power source circuit for supplying current to the solenoid 104 of the solenoid-controlled valve combined with the wheel brake cylinder 130 includes a control circuit (not shown) for changing the value of current applied to the solenoid 104 on the basis of the speed of the car, slip ratio and deceleration of the wheel. The speed of the car, slip ratio and deceleration of the wheel can be obtained by electrically operating and processing electric pulses applied from a speed sensor, which serves to detect the rotation speed of each of the wheels.

Figure 2:
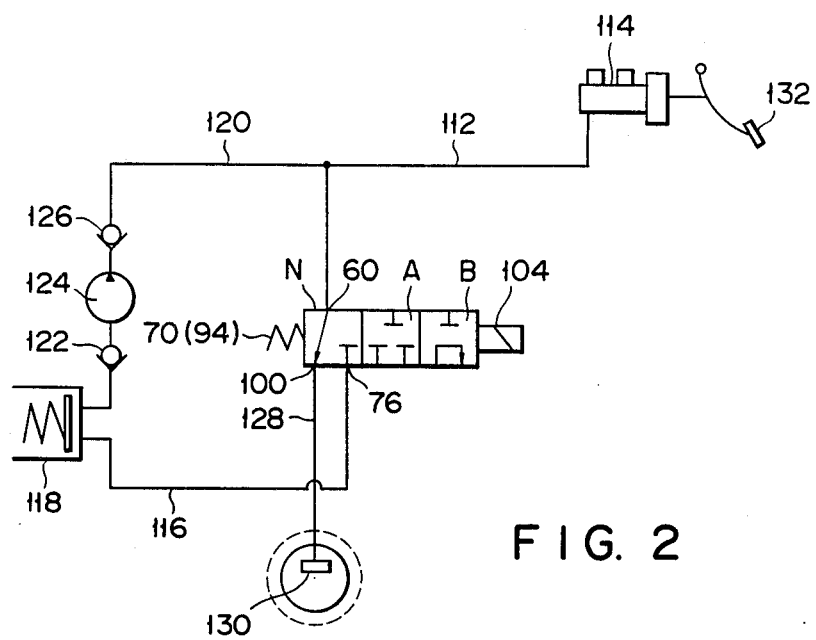
FIG. 2 is a sketch of the antiskid brake system including the solenoid-controlled valve by symbols to make it easier to explain the operation of the solenoid-controlled valve.

The operation of the antiskid brake system in which the solenoid-controlled valve of the present invention is used relative to a wheel of the car will be described referring to FIG. 2. The solenoid-controlled valve of the present invention is represented by symbols in FIG. 2. In a case where the car is running at a uniform speed, its wheel is rotating at the uniform speed and the rotating state of its wheel does not reach a predetermined deceleration and slip ratio accordingly. No current of any level is applied to the solenoid 104 of the solenoid-controlled valve in this case, and the solenoid-controlled valve is held at the neutral position N, as described above. When the brake pedal 132 is pushed down under this condition, hydraulic pressure in the first pressure chamber of the master cylinder 114 rises. The hydraulic pump 124 is driven at the same time when the brake pedal 132 is pushed down, and pressurized liquid is thus fed from the hydraulic pump 124 to the hydraulic pipe 120. Since the first and second ports 60 and 100 are opened, in other words, they are communicated with each other through the control chamber 48 when the solenoid-controlled valve is at the neutral position N, liquid pressurized in the first pressure chamber of the master cylinder 114 and another pressurized liquid fed from the hydraulic pump 124 to the hydraulic pipe 120 are transmitted to the wheel cylinder 130 through the hydraulic pipe 112, solenoid-controlled valve and hydraulic pipe 116, thereby causing the wheel to be braked. When the solenoid-controlled valve is at the neutral position N, the operating state of the wheel cylinder 130 is under the pressurizing mode.

In a case where liquid pressure in the wheel cylinder 130 is raised by this braking operation and the rotating state of the wheel reaches or exceeds the predetermined deceleration or slip ratio, high level current is supplied to the solenoid 104 of the solenoid-controlled valve. In this case, therefore, the solenoid-controlled valve is switched from the neutral position N to the second changeover position B, as described above. When it is at the second changeover position, the first port 60 becomes closed, while the second port 76 becomes opened, that is, the second and third ports 76 and 100 are communicated with each other through the control chamber 48. As the result, the wheel cylinder 130 is connected to the reservoir tank 118 through the hydraulic pipe 128, solenoid-controlled valve and hydraulic pipe 116, and in this case, therefore, liquid pressurized in the wheel brake cylinder 130 escapes into the reservoir tank 118, so that braking force caused by the wheel brake cylinder 130 can be reduced. When the solenoid-controlled valve is at the second changeover position B, the operating state of the wheel brake cylinder 130 is under the pressure-reducing mode. Pressurized liquid fed from the hydraulic pump 124 into the hydraulic pipe 120 is returned to the reservoir tank 118 through a relief valve (not shown) because the first port 60 of the solenoid-controlled valve is left closed.

In a case where the braking pressure of the wheel brake cylinder 130 is reduced as described above and the rotating state of the wheel is restored to reach the predetermined deceleration or becomes smaller than the predetermined deceleration, current of low level is supplied to the solenoid 104 of the solenoid-controlled valve, which is thus switched from the second changeover position B to the first changeover position A. When it is at the first changeover position A, both of the first and second ports of the solenoid-controlled valve become closed and all of connections between the wheel brake cylinder 130 and the reservoir tank 118, between the wheel brake cylinder 130 and the master cylinder 114, and between the wheel brake cylinder 130 and the hydraulic pump 124 are shut off. In this case, therefore, liquid pressure in the wheel brake cylinder 130 is kept constant. Namely, the operating state of the wheel brake cylinder 130 is under the brake pressure holding mode. Pressurized liquid fed from the hydraulic pump 124 into the hydraulic pipe 120 is also returned to the reservoir tank 118 through the relief valve in this case.

When the rotating state of the wheel becomes uniform or accelerated thereafter, the supply of current to the solenoid 104 of the solenoid-controlled valve is stopped, thereby causing the solenoid-controlled valve to again be returned to the neutral position N. As a result, pressurized liquid fed mainly from the hydraulic pump 124 is again supplied to the wheel brake cylinder 130 through the solenoid-controlled valve to increase braking force for the wheel in this case.

When the above-described braking operation is carried out according to the rotating state of each of the wheels, therefore, the stability of directionally controlling the car can be enhanced and shortening of its braking distance can be achieved even at the time of rapidly braking the car. When the brake pedal 132 is released, driving of the hydraulic pump 124 is stopped, thereby enabling the car to be smoothly accelerated.

When the solenoid-controlled valve of the present invention, which can be made lighter and smaller, is applied to the antiskid brake system of the car, as described above, the whole of this brake system can be made lighter. In addition, the solenoid-controlled valve of the present invention is simple in its operating mechanism. Therefore, its operation can provide high reliability, and it is thus extremely suitable for use to the brake system of the car.

Figure 3:
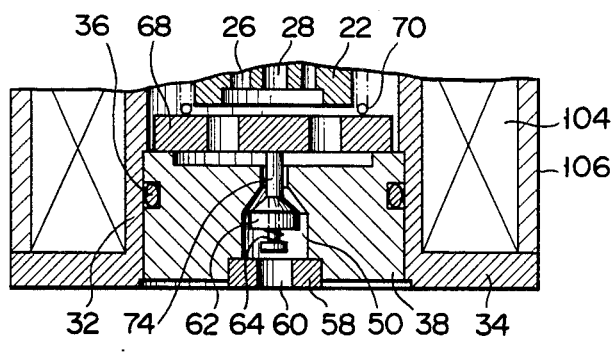
FIGS. 3 and 4 are sectional views showing a part of other variations of the solenoid-controlled valve according to the present invention.

It should be understood that the present invention is not limited to the above-described example but that various changes and modifications can be made without departing from the spirit and scope of the present invention. FIG. 3 shows another example in which the first valve member 62 is attached to the coupling rod 74. The first valve member 62 is freely, slidably mounted to the small-diameter portion of the coupling rod 74, and in this case, it is urged by the valve spring 58 to contact the stepped portion of the coupling rod 74, the valve spring 58 being attached to the coupling rod 74, enclosing the small-diameter portion thereof.

Figure 4:
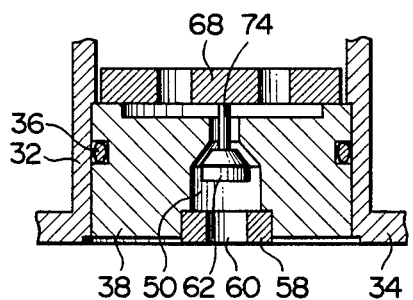

FIG. 4 shows a further example in which the first valve member 62 is connected integral to the coupling rod 74.

Needless to say, the same function as that in the case of the above-described first example can be achieved even in the case of these variations shown in FIGS. 3 and 4.

What is claimed is:

1. A solenoid-controlled valve comprising:
   a housing having an interior control chamber and including a tubular part closed at its opposite ends by first and second end parts of non-magnetic material, said tubular part having first and second end portions of magnetic material separated by an intermediate portion of non-magnetic material;
   means defining first and second ports in said first and second end parts, respectively, communicating with said chamber, said first port having an outwardly facing first valve seat and said second port having an inwardly facing second valve seat;
   a first valve member cooperating with said first seat to close said first port;
   seating spring means urging said first valve member to seat to close said first port;
   a second valve member cooperating with said second valve seat to close said second port;
   means defining a third port in said second end part communicating with said chamber;
   first and second members in said chamber, made of magnetic material and located adjacent and movable toward and away from said first and second ports, respectively, said first member being provided with means to engage and unseat said first valve member and said second movable member being engageable with to seat said second valve member;
   fixed ported partition means of magnetic material in said chamber between said movable members and peripherally engaged with said second end portion;
   spring means engaged between said partition means and each of said movable members for urging the latter toward their respective end parts to thus unseat said first valve member against the urging of said seating spring means and open said first port and engage said second valve member and close said second port;
   a solenoid surrounding said tubular part and extending beyond the opposite ends of said intermediate portion for applying a magnetic field to the interior of said housing;
   a yoke member which, together with said tubular part, encloses said solenoid, said yoke member, said first end portion, said first movable member, said partition means, said second movable member and said second end portion defining a magnetic circuit having a magnetic flux;
   a magnetic flux by-pass for flowing magnetic flux between said second end portion and said partition means to by-pass said second movable member in said magnetic circuit, said flux by-pass being saturated with a magnetic flux smaller than that in said magnetic circuit; and
   means defining magnetic resistances between said second movable member and said second end portion and between said first movable member and said first and end portion, the resistance between said second movable member and said second end portion being greater than that between said first movable member and said first end portion,
   whereby application of a small electric current to said solenoid magnetically attracts said first movable member toward said partition means with sufficient force to overcome that of said spring means therebetween and allows said first valve member to seat while said flux by-pass lessens the magnetic attraction of said second movable member toward said partition means sufficiently to avoid overcoming the force of said spring means therebetween and thus said second port remains closed, and
   application of a large electric current to said solenoid causes said by-pass to become saturated with magnetic flux and flux flows through said magnetic resistance between said second movable member and said second end portion and develops sufficient magnetic attraction between said second movable member and said partition means to overcome the force of said spring means therebetween and thus unseats said second valve member and opens said second port.

2. The valve defined in claim 1 wherein the by-pass comprises a connection between the partition means and the second end portion having a saturation flux density smaller than that of the circuit.

3. The valve defined in claim 1 including means for guiding the movements of the second movable member including a guide rod on said member cooperating with a guide hole in the partition means.

4. The valve defined in claim 1 wherein the magnetic resistances are defined by a gap between the second movable member and the second end portion larger than a comparable gap between the first movable member and the first end portion.

5. The valve defined in claim 1 wherein the tubular part is cylindrical and first and second ports are coaxial with the axis of said tubular part.

6. The valve defined in claim 1 wherein the partition means is integral with the second end portion.

* * * * *